(12) United States Patent
Yang

(10) Patent No.: US 9,077,662 B2
(45) Date of Patent: Jul. 7, 2015

(54) SERVICE LINKAGE CONTROL SYSTEM AND METHOD

(75) Inventor: Bo Yang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 140 days.

(21) Appl. No.: 13/498,673

(22) PCT Filed: May 18, 2010

(86) PCT No.: PCT/CN2010/072886
§ 371 (c)(1),
(2), (4) Date: Mar. 28, 2012

(87) PCT Pub. No.: WO2010/145381
PCT Pub. Date: Dec. 23, 2010

(65) Prior Publication Data
US 2012/0203885 A1  Aug. 9, 2012

(30) Foreign Application Priority Data

Oct. 22, 2009 (CN) .......................... 2009 1 0180022

(51) Int. Cl.
*G06F 15/173* (2006.01)
*H04L 12/24* (2006.01)
*H04L 12/26* (2006.01)

(52) U.S. Cl.
CPC .......... *H04L 41/5058* (2013.01); *H04L 43/028* (2013.01); *H04L 43/04* (2013.01)

(58) Field of Classification Search
CPC .... H04L 43/028; H04L 41/5058; H04L 43/04
USPC ........................................................ 709/223
See application file for complete search history.

(56) References Cited

U.S. PATENT DOCUMENTS 6,615,262 B2 * 9/2003 Schweitzer et al. .......... 709/224
7,990,870 B2 * 8/2011 Dolganow et al. ............ 370/235
2005/0091482 A1 4/2005 Gray et al.
2005/0222969 A1 10/2005 Yip et al.
2012/0259950 A1* 10/2012 Havekes et al. ............... 709/217

FOREIGN PATENT DOCUMENTS

| CN | 101431424 A | 5/2009 |
| CN | 101547207 A | 9/2009 |
| WO | 2008097105 A1 | 8/2008 |
| WO | 2008142056 A1 | 11/2008 |

* cited by examiner

OTHER PUBLICATIONS

International Search Report for PCT/CN2010/072886 dated Aug. 18, 2010.

*Primary Examiner* — Kevin Bates
*Assistant Examiner* — Nazia Naoreen
(74) *Attorney, Agent, or Firm* — Ling Wu; Stephen Yang; Ling and Yang Intellectual Property

(57) ABSTRACT

A service linkage control system and method are disclosed for implementing service linkage identification and control for separated control channel and data channel in the communication system. The method includes that: a linkage strategy management module (102) sends a first service template of the service needing linkage identification to a Deep Packet Inspection (DPI) identification module (101) to identify the service needing linkage identification, and sends after classification a service identification result and linkage related information to a linkage strategy management module (102) via a DPI identification device information collection database (104) and a linkage information control center (105); the linkage strategy management module (102) generates a service control strategy according to the received service identification result and a predetermined control rule, and issues the control strategy to a DPI control module (103); and the DPI control module (103) receives and implements the control strategy.

5 Claims, 2 Drawing Sheets

SERVICE LINKAGE CONTROL SYSTEM AND METHOD

TECHNICAL FIELD

The present invention relates to the field of a computer network communication technology, and in particular, to a technology of service linkage control for separated control channel and data channel.

BACKGROUND OF THE RELATED ART

With the development and application of Internet technologies, information of a network layer typically needs to be inspected and determined, and network services further need to be identified and controlled.

At present, an idea of having control layer and data layer separated is widely used on the implementation of the network services. Transport paths of a control channel and a data channel for the network services may be totally different, and as a result, if only a message of the control channel is inspected and determined, only control information can be known, and the transport of the data channel cannot be identified and controlled. If only a message of the data path is inspected and determined, only data on the data channel can be obtained, while the data on the data channel does not have distinguished features from other data, therefore, either individually identifying services on the control channel or individually identifying services in the data channel is meaningless.

Therefore, how to perform service linkage identification and control in the condition that the control channel and the data channel are separated is the problem required to be solved.

SUMMARY OF THE INVENTION

The embodiment of the present invention provides a service linkage control system and method, which are used to implement service linkage identification and control in a communication system.

A service linkage control system, comprising:

a Deep Packet Inspection (DPI) identification module, configured to receive a first identification template of a service needing linkage identification, and report a service identification result and linkage related information when identifying the service needing linkage identification according to the first identification template;

a DPI identification device information collection database, configured to receive and store the service identification result and the linkage related information reported by the DPI identification module;

a linkage information control center, configured to read the service identification result and the linkage related information from the DPI identification device information collection database, classify the service identification result and the linkage related information and send the service identification result and the linkage related information to a linkage strategy management module; and the linkage strategy management module, configured to obtain the first service identification template, send the first service template to the DPI identification module, receive the service identification result and the linkage related information, generate a service control strategy according to a predetermined control rule, and issue the service control strategy; and a DPI control module, configured to receive the service control strategy issued by the linkage strategy management module, and implement the control strategy for control.

Further, the linkage strategy management module is further configured to determine a second identification template according to the linkage related information, and send the second identification template to the DPI identification module; and the DPI identification module is further configured to report the service identification result and the linkage related information when identifying a service needing linkage identification according to the second identification template.

Preferably, the service needing linkage identification comprises a service for separated control channel and data channel; the first identification template comprises characteristic information of a service control message; and the linkage related information and the second identification template comprise service connection information.

The linkage strategy management module, the DPI identification device information collection database and the linkage information control center are disposed in an operation support system in the communication system. The DPI identification module and the DPI control module are disposed on a same or different service control devices in the communication system.

A service linkage control method, comprising:

a linkage strategy management module sending a first service template of a service needing linkage identification to a DPI identification module;

the DPI identification module reporting a service identification result and linkage related information to a DPI identification device information collection database when identifying the service needing linkage identification according to the first service identification template;

a linkage information control center reading the service identification result and the linkage related information from the DPI identification device information collection database, classifying the service identification result and the linkage related information and sending the service identification result and the linkage related information to a linkage strategy management module;

the linkage strategy management module generating a service control strategy according to the received service identification result and a predetermined control rule, and issuing the control strategy to a DPI control module; and the DPI control module receiving and implementing the control strategy.

Further, at the time of the linkage strategy management module generating a service control strategy, the method further comprises:

the linkage strategy management module determining a second identification template according to the linkage related information, and sending the second identification template to the DPI identification module; and the DPI identification module reporting a service identification result and linkage related information when identifying a service needing linkage identification according to the second identification template.

According to the technical scheme provided by an embodiment of the present invention, a linkage strategy management module sends a first service template comprising information of a service needing linkage identification to a DPI identification module; the DPI identification module reports a service identification result and linkage related information to a DPI identification device information collection database when identifying the service needing linkage identification according to the first service identification template; a linkage information control center reads the service identification result and the linkage related information from the DPI identification device information collection database, classifies the service identification result and the linkage related information and sends them to a linkage strategy management module; and the linkage strategy management module generates a service control strategy according to the received service identification result and a predetermined control rule, and issuing the corresponding control strategy to a DPI control module, thus implementing service linkage identification and control.

PREFERRED EMBODIMENTS OF THE PRESENT INVENTION

Figure 1:
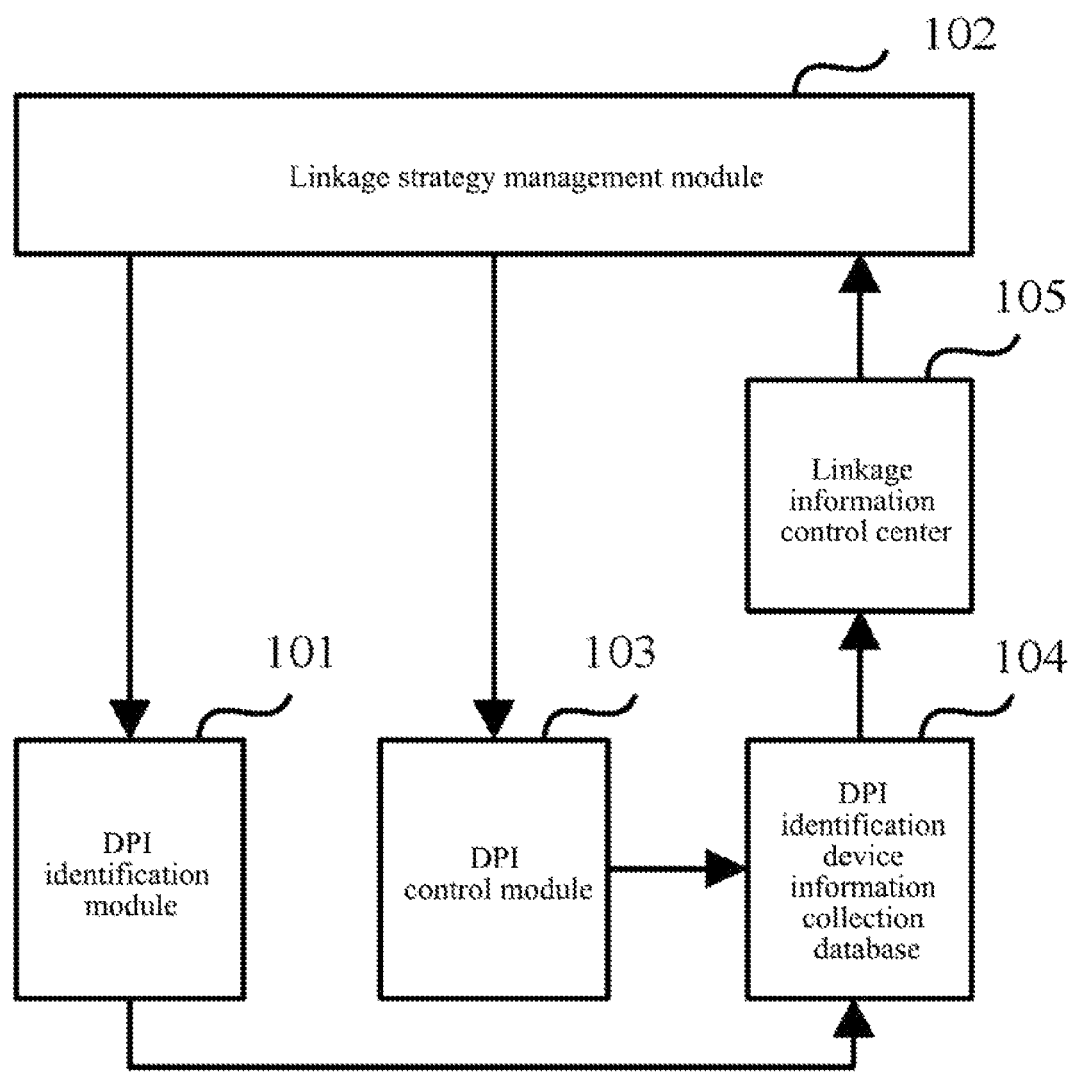
FIG. 1 is a structural diagram of a service linkage control system in a communication system which is provided by an embodiment of the present invention.

According to the technical scheme provided by an embodiment of the present invention, a linkage strategy management module sends a first service template of a service needing linkage identification to a DPI identification module; the DPI identification module reports a service identification result and linkage related information to a DPI identification device information collection database when identifying the service needing linkage identification according to the first service identification template; a linkage information control center reads the service identification result and the linkage related information from the DPI identification device information collection database, and classifies the service identification result and the linkage related information and sends them to a linkage strategy management module; and the linkage strategy management module generates a service control strategy according to the received service identification result and a user predetermined control rule, and issuing the control strategy to a DPI control module, thus implementing service linkage identification and control.

Further, in order to simplify the identification work, the linkage strategy management module determines a second identification template according to service connection information in the linkage related information, and sends the second identification template to the DPI identification module; and the DPI identification module reports a service identification result and linkage related information when identifying a service needing linkage identification according to the second identification template.

There are a number of service types which need linkage identification, for example, a service for separated control channel and data channel. The first identification template comprises characteristic information of a service control message. The linkage related information and the second identification template comprise service connection information. For the service for separated control channel and data channel, only if information of the control channel is obtained and is identified in conjunction with data of the data channel, an actual application of the service can be determined finally, thus implementing control of the service. In this case, it is needed to perform association identification and control. On basis of this, an embodiment of the present invention provides an association control technology, in which an identification template of a service needing linkage control is pre-set, and whether there is related control information of the service needing linkage control in the control channel is identified according to an identification module. For example, when a service of H.232 protocol is identified according to a H.232 service control message, identification information of the H.232 service control message is set in a template, and a service needing linkage control and service connection information are identified from the message in the control channel according to control data, i.e., the control message on the service control channel with characteristic information of the H.232 service control message using a DPI identification technology, and a service identification result and the service connection information are reported to a management module being in charge of the linkage service, and a control strategy is issued by the management module to a control module in conjunction with a predetermined control rule, and the service is controlled by the control module, thus implementing the linkage of the control plane and the data plane.

Because the use of the DPI identification technology needs a large system overhead, the management module further generates a second identification template including service connection information and issues the second identification template to the identification module, and the identification module continues to use the service connection information to identify the service and report an identification result, and the management module determines a control strategy according to the information reported by the identification module and issues the control strategy to an implementation module.

The specific embodiment of a service linkage control system and method in a communication system provided by an embodiment of the present invention will be described in detail in conjunction with accompanying drawings hereinafter.

As shown in FIG. 1, a service linkage control system in a communication system provided by an embodiment of the present invention comprises the following modules.

A DPI identification module 101 receives and stores a first identification template of a service needing linkage identification, and reports a service identification result and linkage related information when the service needing linkage identification is identified according to the first identification template.

A linkage strategy management module 102 is configured to obtain the first service identification template, and send the first service template to the DPI identification module 101, and receive the service identification result and the linkage related information, generate a service control strategy according to a predetermined control rule, and issue the service control strategy to a DPI control module 103.

A DPI control module 103 is configured to receive the service control strategy issued by the linkage strategy management module 102, and perform control in accordance with the control strategy.

Taking into account that the data reported by the identification module 101 is very large, a DPI identification device information collection database 104 and a linkage information control center 105 are further disposed in the linkage control system.

Wherein, the DPI identification device information collection database 104 is configured to receive and store the service identification result and the linkage related information reported by the DPI identification module.

The linkage information control center 105 is configured to read the service identification result and the linkage related information from the DPI identification device information collection database, and classify the service identification result and the linkage related information and send them to a linkage strategy management module.

Further, the linkage strategy management module 102 is configured to determine a second identification template according to the linkage related information, and sends the second identification template to the DPI identification module 101.

The DPI identification module 101 is further configured to report the service identification result and the linkage related information when identifying a service needing linkage identification according to the second identification template.

Thus, in the whole process of performing the service, the DPI identification module 101 can periodically identify the service according to the second identification template and report the identification result, and the linkage strategy management module 102 controls the service using corresponding control strategy according to the identification result of each service.

A specific embodiment is as follows:

a DPI identification module 101, configured to receive and store a first identification template of a service needing linkage identification, obtain identification information of the service from control data in a service control channel, wherein, the first identification template comprises characteristic information of a service control message, and the DPI identification module 101 reports a service identification result and service connection information when identifying the service needing linkage identification according to the characteristic information of the service control message comprised in the first identification template using the DPI technology;

the linkage strategy management module 102, configured to obtain the first service identification template which is set by a user, send the first service template to the DPI identification module 101, receive the service identification result and the service connection information reported by the DPI identification module 101 in the process of the identification, generate a service control strategy according to a user predetermined control rule, and issue the control strategy;

a DPI control module 103, configured to receive and implement the control strategy issued by the linkage strategy management module 102;

a DPI identification device information collection database 104, configured to receive and store the service identification result and the service connection information reported by the DPI identification module 101;

a linkage information control center 105, configured to read the service identification result and the service connection information from the DPI identification device information collection database 104, and classify the service identification result and the service connection information and then send the service identification result and the service connection information to the linkage strategy management module 102.

In the specific implementation, the linkage strategy management module 102, the DPI identification device information collection database 104 and the linkage information control center 105 can be disposed in an operation support system in the communication system. While the DPI identification module 101 and the DPI control module 103 are disposed on a same service control device in the communication system, for example, some key service control points, or can be disposed on different service control devices according to requirements of the linkage control.

Further, in order to simplify the identification work, the linkage strategy management module 102 sends an updated second identification template to the DPI identification device 101 according to the service connection information reported by the DPI identification device 101 for the first time, and the DPI identification device 101 identifies the service according to the second identification template carrying the service connection information and reports the identification result.

It should be illustrated that the time required for the process of service linkage identification and control can be ignored relative to the time for service establishment and operation, that is, the service linkage identification and control will not influence the operation of the service.

Figure 2:
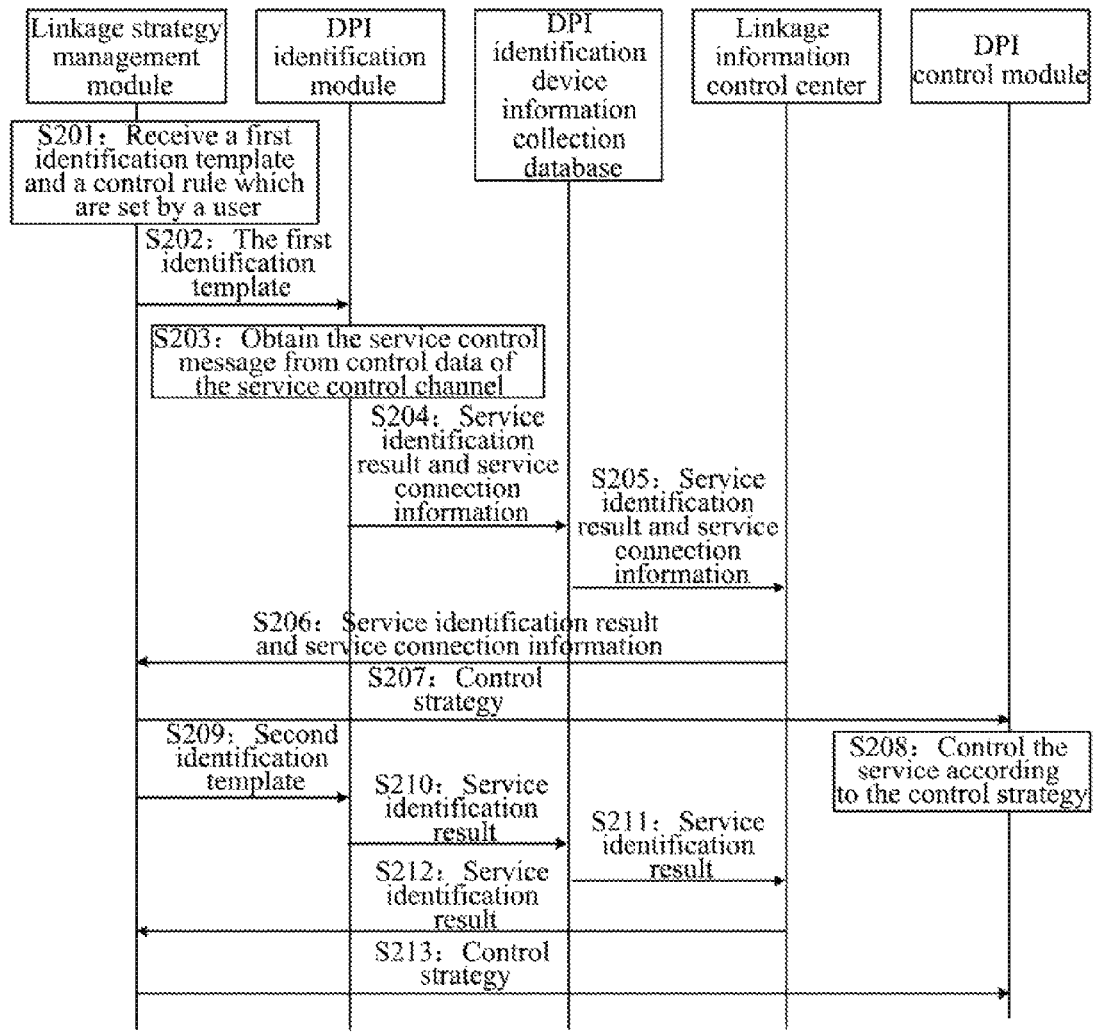
FIG. 2 is a flowchart of a service linkage control method in a communication system which is provided by an embodiment of the present invention.

As shown in FIG. 2, taking a service for separated control channel and data channel as an example, a flowchart of a service linkage control method using a system shown in FIG. 1 provided by an embodiment of the present invention comprises the following steps.

In S201, the linkage strategy management module receives a first identification module and a control rule which are set by a user, wherein, the first identification module comprises characteristic information of a control message for identifying that linkage control is needed in a control channel, and the control rule is a rule set by a user for controlling a service needing linkage control.

As an example, a service needing linkage control is illustrated below. For a protocol for separated control channel and data channel, such as H.323 etc., the linkage identification is needed when a protocol of a port for data transmission is negotiated through a control channel for service identification. Data of the control channel can be identified using an identification template. A structure of the identification template is a corresponding relationship table, which corresponds to services needing linkage control and sets characteristic information corresponding to control messages in the control channel, thus determining services against which the control messages are directed.

The control rule is used to stipulate that a service is controlled after the service is identified. For example, for internet services, the control rule can be: if the website to be browsed by a user is legitimate, the internet services will be permitted; and if the website to be browsed by a user is illegal, the internet services will be prohibited. Thus, for the internet services, only the data of the control channel needs to be identified, without performing linkage identification. For telephone services, the control rule can be: if a subscriber wants to have a conversation over ten minutes, the quality of the conversation exceeding ten minutes will be degraded after the conversion. In the telephone services, data is transmitted through the control channel in the process of a user initiating a call, while in the process of the conversation the data of the telephone services is transmitted through the data channel. Thus, for the telephone services, not only the data of the control channel needs to be identified, but also the data of the data channel needs to be identified, i.e., the linkage identification is needed.

In S202, a linkage strategy management module sends a first identification template to a DPI identification module.

In S203, the DPI identification module obtains a service control message from control data of the service control channel in the process of service establishment and operation.

In S204, the DPI identification module sends a service identification result and service connection information to a DPI identification device information collection database for storage when identifying a service needing linkage identification according to the first identification template and the obtained service control message.

Preferably, after the service operates, in the embodiment of the present invention, the service can be identified by using a DPI technology, a control data stream of the service can be inspected by the DPI technology, and identification information of the service can be obtained. The identification template is compared with the obtained identification information, to obtain the service identification result, and the service connection information is obtained from the control data stream.

For example, in the telephone services, the data is transmitted through the control channel in the process of a user initiating a call, and can identifies the data of the service control channel according to the identification template, to obtain a service identification result and service connection information. For example, after a telephone user A initiates a call, it can be known according to the identification template that the service is a telephone service initiated by a subscriber. In the internet services, the data of the service control channel can be identified according to the identification template, to learn that the website to be browsed by the user is legitimate.

Whether the service needs linkage identification can be determined according to the obtained service identification result and the service connection information, for example, if a control message of the telephone services is discovered through the identification template, the service is determined to be a telephone service, and the linkage identification is needed.

If it is found that the service does not need the linkage identification, for example, the service is discovered to be an internet service through the identification template, while the internet service does not need linkage identification, no information will be reported.

In S205-S206, a linkage information control center reads the service identification result and the service connection information from the DPI identification device information collection database, and classifies the service identification result and the service connection information and sends them to a linkage strategy management module.

In S207, the linkage strategy management module generates a service control strategy according to a pre-set control rule when receiving the service identification result and the service connection information, and issues the corresponding control strategy to a DPI control module.

In S208, the DPI control module controls the service according to the corresponding control strategy.

In S209, the linkage strategy management module further comprises the service connection information in a second identification template and issues it to the DPI identification device.

In S210-213, the DPI identification device continues to identify a service according to the second identification template and reports an identification result, and the linkage strategy management module generates a service control strategy according to a pre-set control rule when receiving the service identification result, and issues the corresponding control strategy to the DPI control module.

Step S210-213 can be enabled periodically, and the linkage strategy management module issues the corresponding control strategy when receiving the service identification result each time, and thus, the linkage identification and control can be implemented in the whole process of the service.

For example, for a duration of a conversation of subscriber A exceeding ten minutes, the control strategy is to degrade the quality of the conversation of the user A, and then the DPI control module performs the strategy to control the user services of the corresponding data channel, so as to achieve the purpose of linkage control of the service for separated control channel and data channel.

It should be illustrated that, the DPI identification module can also sends the service identification result and the service connection information to the linkage strategy management module directly.

It should be further illustrated that, the above description is only an illustration by example of linkage identification control of one service, different services have corresponding identification templates, and the control strategy may be established for a particular single service, or can also be established for a plurality of services synthetically.

An illustration will be made by a specific example, for example, the download traffic of a BT application is limited to 200 M using the present system.

First, the linkage strategy management module issues a pre-set identification template according to linkage service requirements, and the function of the identification template is to discover that this is an application of BT downloading (the first template is a BT application-BitTorrent) through a characteristic value "BitTorrent" in a message. Then, the DPI identification module will perform deep inspection on the message, and the so-called deep inspection is to inspect contents of the message (2-7 layers of the OSI model). Once the characteristic value, i.e., BitTorrent is found, it can be considered that it is discovered to be a BT application. At this time, connection information of the BT service needs to be extracted, and information such as a negotiated port number, a destination address, a source address, a destination port, a source port, a protocol type etc. of the transmitted data of the stream is extracted. For example, if the information (source IP 192.168.1.1, source port 8080, destination address 10.10.10.1, destination port 80, and protocol UDP) is extracted, the information or related information such as the field where it is located etc. will be provided to a DPI identification information collection database, and a linkage control center will classify the information and provide it to a linkage strategy decision management module. The information classification in the present example belongs to a BT service class.

The linkage strategy decision management module makes a decision to issue a second identification module. Contents of the second identification template are "source IP192.168.1.1, source port 8080, destination address 10.10.10.1, destination port 80, protocol UDP-corresponding BT service stream". At the same time, the control strategy is issued to the DPI control module. Once the DPI identification module uses the second identification template for inspection to discover that the download traffic of the subsequent messages has been reached 200M, the DPI identification module reports it to the linkage strategy management module, and a control strategy of disconnection is issued by the linkage strategy management module to the DPI control module to disconnect the BT connection, and thus implementing the purpose of controlling the download traffic to 200M.

The reason of needing the second identification template primarily is a consideration on system performance and an actually negotiated port. The overhand for inspecting contents of layer 2-7 in the OSI model of the message is hundreds of times larger than that for only inspecting contents of layers 2-3 of the message. At the same time, the port negotiated by services needing linkage is unknown without the first identification. In conclusion, both the first identification template and the second identification template are needed, and both templates are used for identifying the BT service, but the complex degrees are completely different.

Obviously, various changes and variations can be made to the present invention by those skilled in the art without departing from the spirit and scope of the present invention.

Thus, these changes and variations are intended to be included in the present invention if such modifications and variations belong to the scope of the claims of the present invention and the scope of the equivalent technologies thereof.

What is claimed is:

1. A service linkage control system, comprising:
a Deep Packet Inspection (DPI) identification module, a DPI identification device information collection database, a linkage information control center, a linkage strategy management module, and a DPI control module, wherein:
the linkage strategy management module is configured to send a first identification template for identifying a service that requires linkage identification to the DPI identification module; wherein said service that requires linkage identification is a service with separated control channel and data channel, and said first identification template contains characteristic information of the service control message in the control channel of said service;
the DPI identification module is configured to obtain the service control messages from the control data in said control channel of said service, and identify said service according to the service control message and said characteristic information contained in said first identification template, after said service is identified, extract connection information of said service which includes a negotiated port number of transmitted data of said service, wherein the negotiated port number of the transmitted data of said service is not known before the identification of said service by using said first identification template, and then report the service identification result and said connection information of said service to the DPI identification device information collection database;
the DPI identification device information collection database is configured to receive and store said service identification result and said connection information of said service reported by the DPI identification module;
the linkage information control center is configured to read said service identification result and said connection information of said service from the DPI identification device information collection database, classify and send said service identification result and said connection information of said service to the linkage strategy management module;
the linkage strategy management module is further configured to generate a second identification template according to said service identification result and said connection information of said service, wherein said second identification template generated contains said connection information of said service which includes the negotiated port number of the transmitted data of said service and which is extracted after said service is identified by using said first identification template, and send said second identification template containing said connection information of said service to the DPI identification module, and meanwhile, generate a control strategy for said service according to a predetermined control rule and send the control strategy to the DPI control module;
the DPI identification module is further configured to identify said service according to said second identification template containing said connection information of said service, and report the service identification result to the linkage strategy management module;
the DPI control module is configured to receive the control strategy sent by the linkage strategy management module, and implement the control strategy for control.

2. The service linkage control system according to claim 1, wherein, the linkage strategy management module, the DPI identification device information collection database and the linkage information control center are disposed in an operation support system in the communication system.

3. The service linkage control system according to claim 1, wherein, the DPI identification module and the DPI control module are disposed on a same or different service control devices in the communication system.

4. A service linkage control method, comprising:
a linkage strategy management module sending a first identification template for identifying a service that requires linkage identification to a Deep Packet Inspection (DPI) identification module; wherein said service that requires linkage identification is a service with separated control channel and data channel, and said first identification template contains characteristic information of the service control message in the control channel of said service;
the DPI identification module obtaining the service control messages from control data in said control channel of said service, and identifying said service according to the service control message and said characteristic information contained in said first identification template, after said service is identified, extracting connection information of said service which includes a negotiated port number of transmitted data of said service, wherein the negotiated port number of the transmitted data of said service is not known before the identification of said service by using said first identification template, and then reporting the service identification result and said connection information of said service to a DPI identification device information collection database;
a linkage information control center reading said service identification result and said connection information of said service from the DPI identification device information collection database, classifying and sending said service identification result and said connection information of said service to the linkage strategy management module;
the linkage strategy management module generating a second identification template according to said service identification result and said connection information of said service, wherein said second identification template generated contains said connection information of said service which includes the negotiated port number of the transmitted data of said service and which is extracted after said service is identified by using said first identification template, and sending said second identification template containing said connection information of said service to the DPI identification module, and meanwhile, generating a control strategy for said service according to a predetermined control rule and sending the control strategy to the DPI control module;
the DPI identification module identifying said service according to said second identification template containing said connection information of said service and reporting the service identification result to the linkage strategy management module; and
the DPI control module receiving the control strategy sent by the linkage strategy management module and implementing the control strategy.

5. The method according to claim 4, wherein
the step of the DPI identification module identifying said service according to said first identification template comprises: the DPI identification module inspecting contents of layers 2-7 of the Open System Interconnection (OSI) model of the message;
the step of the DPI identification module identifying said service according to said second identification template comprises: the DPI identification module inspecting contents of layers 2-3 of the OSI model of the message.

* * * * *